United States Patent [19]

Harman et al.

[11] 4,432,658
[45] Feb. 21, 1984

[54] TEMPERATURE SENSOR

[75] Inventors: Geoffrey E. Harman, Bristol, England; Malcolm J. F. James, Ontario, Canada

[73] Assignee: Rolls-Royce Limited, England

[21] Appl. No.: 328,254

[22] Filed: Dec. 7, 1981

[30] Foreign Application Priority Data

Dec. 6, 1980 [GB] United Kingdom ............... 8039190

[51] Int. Cl.³ ............................................. G01K 1/08
[52] U.S. Cl. ..................................... 374/138; 374/141
[58] Field of Search ............... 374/141, 201, 147, 148, 374/135, 203, 208, 138; 60/39.092, 39.093

[56] References Cited

U.S. PATENT DOCUMENTS

| | | | |
|---|---|---|---|
| 2,647,366 | 8/1953 | McCann | 60/39.093 |
| 2,750,798 | 6/1956 | Ruskin et al. | 374/135 |
| 2,931,227 | 4/1960 | Werner et al. | 374/138 |
| 3,167,960 | 2/1965 | Miesiak | 374/138 |
| 3,623,367 | 11/1971 | Benedict | 374/135 |
| 3,998,048 | 12/1976 | Derue | 60/39.092 |
| 4,047,379 | 9/1977 | Brookes et al. | 374/135 |

Primary Examiner—Charles E. Frankfort
Assistant Examiner—David R. Schuster
Attorney, Agent, or Firm—Parkhurst & Oliff

[57] ABSTRACT

An anti-icing airflow temperature sensor (2) comprising a temperature sensitive element (4) and a casing (6) around the temperature sensitive element, the front (8) of the casing having apertures (10,12) of high perimeter-/aspect ratio, the side of the casing having outwardly forwardly inclined apertures (20) adjacent the temperature sensitive element, the rear (14) of the casing having a substantial open area and the casing having a substantial unapertured portion between its front and the side aperture or apertures.

5 Claims, 4 Drawing Figures

U.S. Patent     Feb. 21, 1984     4,432,658
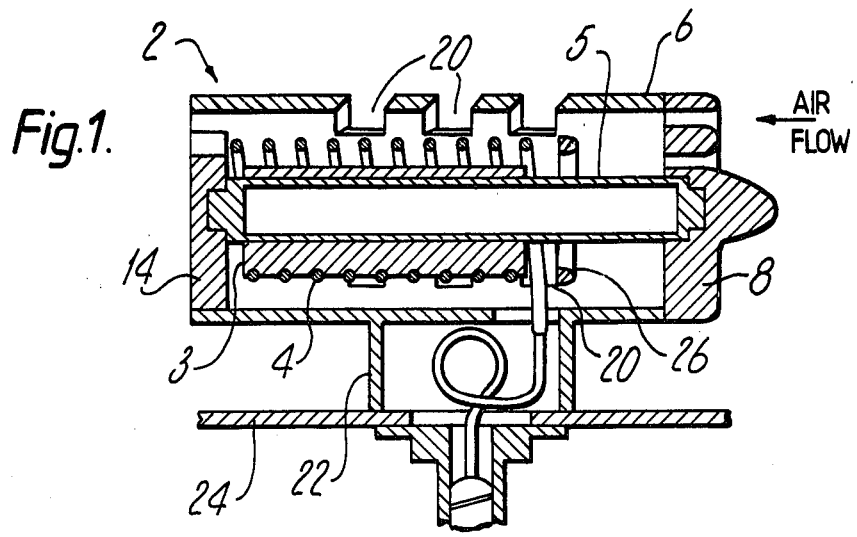
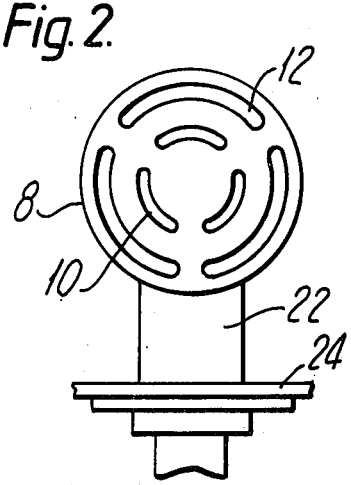
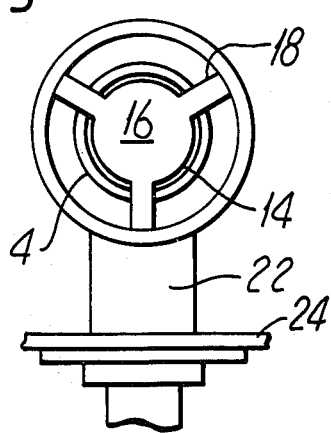
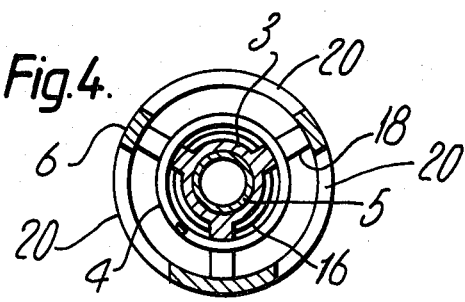

TEMPERATURE SENSOR

DESCRIPTION

This invention relates to temperature sensors for use in airflows.

Such temperature sensors find use, for example, in gas turbine engines in aircraft for measuring intake air temperature. Known intake air temperature sensors of this type suffer from icing up in certain aircraft conditions, preventing a true temperature measurement from being obtained and resulting in the engine operating inefficiently, or alternatively requiring the inclusion of a heater to prevent such icing.

It is an object of the present invention to provide a temperature sensor for use in an airflow in which the above problem may be overcome or at least alleviated.

According to the present invention a temperature sensor for use in an airflow comprises a temperature sensitive element; and a casing around the temperature sensitive element, the side of the casing having one or more outwardly forwardly inclined apertures adjacent the temperature sensitive element, the rear of the casing having a substantial open area and the side of the casing having a substantial unapertured portion between its front and the side aperture or apertures.

Preferably the front of the casing has one or more apertures of high perimeter/area ratio.

Preferably the aperture or apertures in the front of the casing have smallest cross-sectional dimensions not greater than substantially ⅛ inch.

Preferably the unapertured portion of the casing between its front and the side aperture or apertures is not less than substantially 0.6 inches in length.

Preferably the outwardly forwardly inclined aperture or apertures in the side of the casing are inclined at substantially 45° to the length of the casing.

Preferably the temperature sensor further comprises a shield member positioned in the casing in front of the temperature sensitive element to prevent direct impingement of water onto the temperature sensitive element.

Preferably the casing is of substantially cylindrical shape.

One temperature sensor in accordance with the invention will now be described, by way of example only, with reference to the accompanying drawings in which:

FIG. 1 shows a cross-sectional side elevation of the sensor;

FIG. 2 shows a front elevation of the sensor;

FIG. 3 shows a rear elevation of the sensor; and

FIG. 4 shows a cross-sectional front elevation of the sensor.

Referring firstly to FIG. 1, a temperature sensor 2 for use in measuring the air intake temperature of a gas turbine engine (not shown) for powering an aircraft (also not shown) includes a temperature sensitive element 4. The temperature sensitive element 4 is in the form of a coiled tube filled with liquid, the thermal expansion of the liquid being used to sense the temperature. Other forms of temperature sensitive elements such as thermocouples or resistance bulbs may alternatively be used. The temperature sensitive element 4 is housed in a protective casing 6 of hollow, generally cylindrical shape and is supported on a three-limbed former 3 mounted on a central spindle 5 therein. The casing has an overall length of approximately 3½" and a wall thickness of approximately 0.1".

Referring now also to FIG. 2, the casing 6 is provided with a front plate 8 having two sets of three arcuate, circumferentially extending apertures 10 and 12. Each of the apertures has a radial width of approximately 0.1" and the two sets of apertures 10 and 12 have circumferential lengths of approximately ½" and 1" respectively. The two sets of apertures 10 and 12 lie on pitch circles of approximately ⅝" and 1¼" diameter respectively which are co-axial with the cylinder of the casing 6.

Referring now also to FIG. 3, the casing 6 is provided with a rear plate 14 formed by a small circular central portion 16 of diameter approximately ⅜" having three equi-angularly spaced arms of width approximately ⅛". The spindle 5 is supported on the two end plates 8 and 14.

Referring now also to FIG. 4 the main body of the casing 6 is provided with three sets of outwardly forwardly inclined apertures 20 immediately adjacent the temperature sensitive element 4. Each set consists of three similarly sized apertures extending around the circumference of the cylindrical body in a plane normal to its axis, each aperture subtending an arc of approximately 90°. The three sets are spaced along the axis of the cylindrical body so as to extend along and immediately adjacent to the temperature sensitive element 4. As can be seen in FIG. 1 the apertures 20 are inclined outwardly and forwardly at an angle of approximately 45° to the axis of the cylindrical body. The apertures 20 each have an axial width of approximately 5/16". As can also be seen from FIG. 1, the sets of apertures 20 are positioned so as to leave a substantial unapertured portion in the side of the casing approximately ¾" long in front of the temperature sensitive element 4.

The casing 6 has attached thereto a hollow support member 22 for supporting the temperature sensor 2 on a support plate 24 which may be attached to the engine air intake. The coiled liquid-filled tube of the temperature sensitive element 4 passes through the hollow support member 22 to expansion sensing apparatus (not shown). There is also provided in the casing an annular ring 26 positioned in front of the coiled tube of the temperature sensitive element 4 to prevent direct impingement of water onto the coiled tube of the temperature sensitive element 4.

In use of the above sensor there is no need for power or air bleed requirements and the sensor has been shown to be of a rugged design combining accuracy and good response rate in icing conditions with protection against accidental and foreign object damage.

In particular, the ventilation of the front of the casing with a large open area with the apertures having a high perimeter/cross-sectional area ratio produces a large airflow over the temperature sensitive element, and hence a high response rate, in clear air, while producing rapid blockage when icing conditions are entered to prevent direct icing of the temperature sensitive element. The outwardly and forwardly inclined apertures in the side of the casing provide good airflow over the temperature sensitive element in icing conditions when the holes in the front of the casing are completely blocked, and the large open area at the rear end of the casing gives low airflow resistance. The substantial unapertured portion of the casing between its front and the temperature sensitive element inhibits the blocking of the side apertures by ice formed by water runback. Additionally, the annular ring in front of the coiled tube of the temperature sensitive element prevents icing thereof by preventing water from impinging directly thereon.

We claim:

1. A temperature sensor for use in an air flow, comprising:
    a temperature sensitive element;
    a hollow cylindrical casing enclosing said temperature sensitive element, said cylindrical casing having a longitudinal axis disposed generally in line with a direction of said air flow and having forward and rearward open ends;
    a front plate facing for partially closing said forward end of said cylindrical casing;
    first and second aperture means;
    said first aperture means being formed in said hollow cylindrical casing and comprising a plurality of rows of slot-like apertures arranged transversely to said longitudinal axis of said cylindrical casing, each of said slot-like apertures in said cylindrical casing having a relatively small width and a relatively large transverse length and being outwardly forwardly inclined such that said air flow passing over said cylindrical casing is directed into an interior of said cylindrical casing to flow over said temperature sensitive element;
    said second aperture means being formed in said front plate facing and comprising a plurality of arcuate slot-like apertures, each of said arcuate slot-like apertures in said front plate facing having a large ratio of perimeter length to cross-sectional area such that air flow can pass easily therethrough while enabling rapid blockage thereof by ice when icing conditions are prevalent in the air flow;
    wherein said hollow cylindrical casing further comprises a forwardly extending unapertured portion adjacent to said front plate facing such that any ice buildup occurs between said first aperture means and said front plate facing in the interior of said cylindrical casing.

2. A temperature sensor as in claim 1, wherein said slot-like apertures arranged transversely to said longitudinal axis of said cylindrical casing are forwardly inclined at an angle of substantially 45° with said longitudinal axis of said cylindrical casing.

3. A temperature sensor as in claim 1, wherein a shield member is positioned in said cylindrical casing between said temperature sensitive element and said unapertured portion and is adapted to prevent direct impingement of water onto said temperature sensitive element.

4. A temperature sensor as in claim 1, wherein a rear plate partially closes said rearward end of said hollow cylindrical casing, said rear plate adapted to allow relatively free flow of air therethrough.

5. A temperature sensor as in claim 1, wherein said temperature sensor is mounted on a support member in such manner as to be directly in said air flow, thus improving the accuracy of said temperature sensor.

* * * * *